United States Patent
Kanauchi (10) Patent No.: US 8,798,549 B2
(45) Date of Patent: Aug. 5, 2014

(54) RADIO COMMUNICATION DEVICE HAVING CARRIER PHASE NOISE ELIMINATION FUNCTION, AND RADIO COMMUNICATION METHOD

(75) Inventor: Tomohiro Kanauchi, Tokyo (JP)

(73) Assignee: NEC Corporation, Tokyo (JP)

( * ) Notice: Subject to any disclaimer, the term of this patent is extended or adjusted under 35 U.S.C. 154(b) by 86 days.

(21) Appl. No.: 13/393,611

(22) PCT Filed: Sep. 3, 2010

(86) PCT No.: PCT/JP2010/065134
§ 371 (c)(1),
(2), (4) Date: Mar. 1, 2012

(87) PCT Pub. No.: WO2011/027859
PCT Pub. Date: Mar. 10, 2011

(65) Prior Publication Data
US 2012/0155583 A1   Jun. 21, 2012

(30) Foreign Application Priority Data
Sep. 4, 2009 (JP) .................................. 2009-204614

(51) Int. Cl.
H04B 17/00 (2006.01)
H04B 15/00 (2006.01)
H04B 1/04 (2006.01)

(52) U.S. Cl.
USPC ..................... 455/67.13; 455/63.1; 455/114.2

(58) Field of Classification Search
USPC ........................... 455/67.13, 63.1, 114.2, 501
See application file for complete search history.

(56) References Cited

U.S. PATENT DOCUMENTS

| | | |
|---|---|---|
| 6,490,010 B1 | 12/2002 | Shibuya et al. |
| 8,135,088 B2 | 3/2012 | Palanki et al. |
| 2002/0111142 A1* | 8/2002 | Klimovitch ..................... 455/63 |
| 2010/0008493 A1* | 1/2010 | Marum et al. ................. 379/386 |
| 2010/0097151 A1* | 4/2010 | Arai ................................ 331/25 |
| 2012/0188994 A1 | 7/2012 | Palanki et al. |

FOREIGN PATENT DOCUMENTS

| | | |
|---|---|---|
| CN | 1529421 | 9/2004 |
| CN | 1543154 | 11/2004 |

(Continued)

OTHER PUBLICATIONS

International Search Report, PCT/JP2010/065134, Dec. 7, 2010.
(Continued)

Primary Examiner — Yuwen Pan
Assistant Examiner — Xin Jia
(74) Attorney, Agent, or Firm — Young & Thompson (57) ABSTRACT

A radio communication device reproduces a carrier signal by eliminating phase noise from a carrier phase signal detected from a received baseband signal. Herein, a filtering characteristic having a default value is adopted to eliminate phase noise from the carrier phase signal with respect to a firstly received baseband signal. Integrated phase noise characteristics are calculated by adding a transmission-side phase noise characteristic, which is extracted from a radio frame demodulated from the carrier signal, to a predetermined reception-side phase noise characteristic. An optimum filtering characteristic is selected through comparison between a threshold and integrated phase noise characteristics. The selected filtering characteristic is adopted to eliminate a noise component from the carrier phase signal with respect to a subsequent baseband signal.

11 Claims, 4 Drawing Sheets

(56) References Cited

FOREIGN PATENT DOCUMENTS

| | | |
|---|---|---|
| CN | 101309253 | 11/2008 |
| JP | 2-046045 | 2/1990 |
| JP | 2002-152167 | 5/2002 |
| RU | 2007-137032 A | 4/2009 |
| WO | WO 2008/099735 | 8/2008 |
| WO | 2009099735 | 8/2009 |

OTHER PUBLICATIONS

Russian Office Action dated Oct. 2, 2013; Patent Application No. 2012106303.

CN Office Action dated Nov. 21, 2013, with English Translation; Application No. 201080039234.7.

* cited by examiner

ID FIELD

The present invention relates to a radio communication device and a radio communication method, which implement carrier reproduction by eliminating a phase noise component from a carrier phase signal detected from a baseband signal.

The present application claims priority on Japanese Patent Application No. 2009-204614, the entire content of which is incorporated herein by reference.

BACKGROUND ART

Recently, various technologies for improving radio communication quality have been developed. For example, radio communication devices that implement carrier reproduction by eliminating phase noise components from carrier phase signals detected from baseband signals have been developed.

Figure 4:
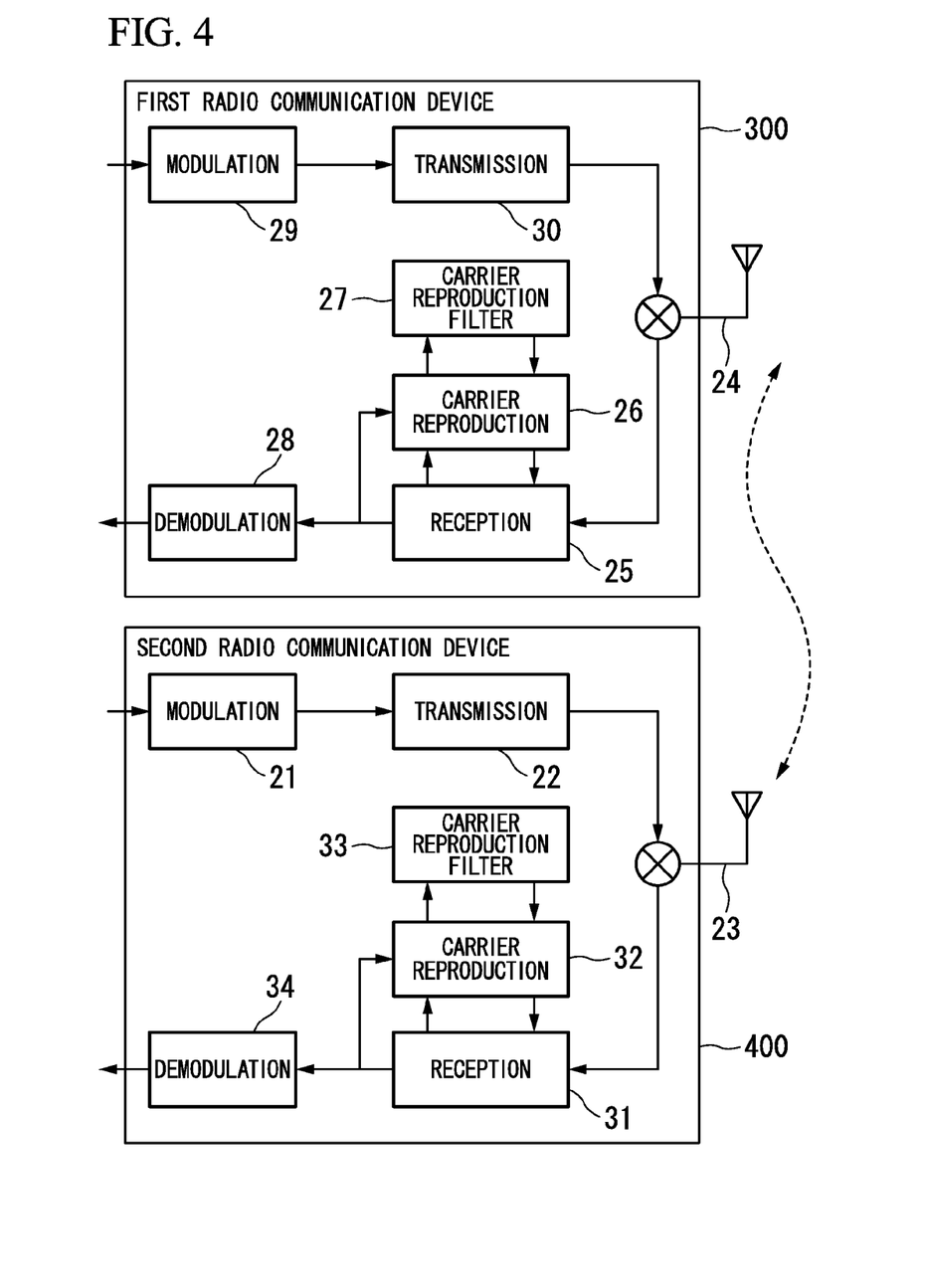
[FIG. 4] A block diagram showing a radio communication device having a carrier phase noise elimination function.

FIG. 4 is a block diagram showing a radio communication device having a carrier phase noise elimination function. Herein, radio communication is conducted between a first radio communication device 300 and a second radio communication device 400.

In the first radio communication device 300, an antenna 24 receives a radio signal transmitted by the second radio communication device 400 so as to send it to a reception part 25. Additionally, the antenna 24 transmits a transmission signal, input by a transmission part 30, to the second radio communication device 400.

The reception part 25 of the first radio communication device 300 converts a reception signal of the antenna 24 into a baseband signal, implements clock synchronization and carrier synchronization, and then sends it to a demodulation part 28 and a carrier reproduction part 26.

The carrier reproduction part 26 of the first radio communication device 300 detects a carrier phase signal from a baseband signal so as to send it to a carrier reproduction filter 27. The carrier reproduction part 26 implements carrier reproduction using a carrier phase signal from which its noise component is eliminated by the carrier reproduction filter 27. The carrier reproduction part 26 sends the reproduced carrier signal to the reception part 25, which thus implements carrier synchronization on a baseband signal.

According to a filtering characteristic which has been determined in conformity with a phase noise characteristic presumed in a design stage, the carrier reproduction filter 27 of the first radio communication device 300 eliminates a noise component from a carrier phase signal input by the carrier reproduction part 26. The carrier reproduction filter 27 sends back the carrier phase signal, from which its noise component has been eliminated, to the carrier reproduction part 26.

A demodulation part 28 of the first radio communication device 300 receives and demodulates a baseband signal of the reception part 25, thus sending a demodulated radio frame to an external device. On the other hand, the modulation part 29 modulates a radio frame input from the external device so as to send a baseband signal to the transmission part 30. The transmission part 30 converts the baseband signal of the modulation part 29 into a radio frequency signal (an RF signal), thus sending it to the antenna 24.

The second radio communication device 400 includes a modulation part 21, a transmission part 22, an antenna 23, a reception part 31, a carrier reproduction part 32, a carrier reproduction filter 33, and a demodulation part 34, thus carrying out the same radio communication process as the first radio communication device 300.

Patent Document 1 discloses a phase synchronization circuit having a phase noise detection function that compares a reception signal and a reference signal so as to detect phase noise in a radio communication device.

PRIOR ART DOCUMENT

Patent Document

Patent Document 1: Japanese Patent Application Publication No. H02-46045

SUMMARY OF THE INVENTION

Problem to be Solved by the Invention

The foregoing radio communication device suffers from problems such as deterioration of BER (Bit Error Rate) and impossibility of stabilizing carrier synchronization since the filtering characteristic of a carrier reproduction filter is fixed in conformity with the phase noise characteristic presumed in a design stage. This is because the radio communication device cannot optimize its filtering characteristic relative to its actual phase noise characteristics when actual phase noise characteristics of the radio communication device deviate from the phase noise characteristic presumed in a design stage or when the phase noise characteristic varies depending on a combination of a transmitter and a receiver actually involved in radio communication.

The deterioration of BER may occur upon setting a broadband filtering characteristic relative to actual phase noise characteristics of a radio communication device, whilst carrier synchronization cannot be stabilized due to the impossibility of carrier reproduction keeping track of phase noise upon setting a narrowband filtering characteristic. To cope with these problems, a plurality of radio communication devices involved in radio reception/transmission needs to be arranged in opposition so as to detect phase noise with a phase noise detector, thus appropriately selecting a carrier reproduction filter. In this case, it is necessary to provide a complex constitution incorporating a phase noise detector into a radio communication device.

Means for Solving the Problem

The present invention is made in consideration of these circumstances, wherein its object is to provide a radio communication device and a radio communication method implementing a function for eliminating a phase noise component from a carrier phase signal detected from a baseband signal with a simple constitution.

A radio communication device of the present invention includes a carrier reproduction filter that eliminates a noise component from a carrier phase signal detected from a received baseband signal; a carrier reproduction part that reproduces a carrier signal based on the carrier phase signal; a reception part that implements carrier synchronization using the carrier signal; a phase noise information extraction part that extracts a transmission-side phase noise characteristic from a radio frame demodulated from the carrier signal; and a filtering characteristic selection part that calculates integrated phase noise characteristics by adding a predetermined reception-side phase noise characteristic to the extracted transmission-side phase noise characteristic and that selects a filtering characteristic based on a comparison between a predetermined threshold and the integrated phase noise characteristics.

Herein, a predetermined default value is applied to the carrier reproduction filter as its filtering characteristic with respect to a firstly received baseband signal, whilst the filtering characteristic selected by the filtering characteristic selection part is applied to the carrier reproduction filter with respect to a subsequent baseband signal.

A carrier reproduction method of the present invention includes the steps of: eliminating a noise component from a carrier phase signal detected from a received baseband signal; reproducing a carrier signal based on the carrier phase signal; implementing carrier synchronization using the carrier signal; extracting a transmission-side phase noise characteristic from a radio frame demodulated from the carrier signal; calculating integrated phase noise characteristics by adding a predetermined reception-side phase noise characteristic to the extracted transmission-side phase noise characteristic; and selecting a filtering characteristic based on a comparison between a predetermined threshold and the integrated phase noise characteristics. A radio communication method of the present invention includes the steps of: implementing the above carrier reproduction method on a received radio signal; implementing carrier synchronization on a reproduced carrier signal; and demodulating the radio signal already subjected to carrier synchronization. Additionally, it includes the steps of: storing a transmission signal and a transmission-side phase noise characteristic in a radio frame; modulating the radio frame into a baseband signal; converting the baseband signal into a radio signal; and transmitting the radio signal.

Herein, a filtering characteristic having a predetermined default value is adopted to eliminate phase noise from the carrier phase signal with respect to a firstly received baseband signal, whilst the selected filtering characteristic is adopted to eliminate phase noise from the carrier phase signal with respect to a subsequent baseband signal.

It is possible to provide a computer-readable program implementing the above radio communication method.

Effect of the Invention

The present invention provides a highly reliable radio communication technology in which a radio communication device stabilizes carrier synchronization irrespective of its actual phase noise characteristics since a carrier reproduction filter adopts a filtering characteristic optimized to its actual phase noise characteristics while preventing desynchronization.

MODE FOR CARRYING OUT THE INVENTION

The present invention will be described in detail by way of embodiments with reference to the accompanying drawings.

Figure 1:
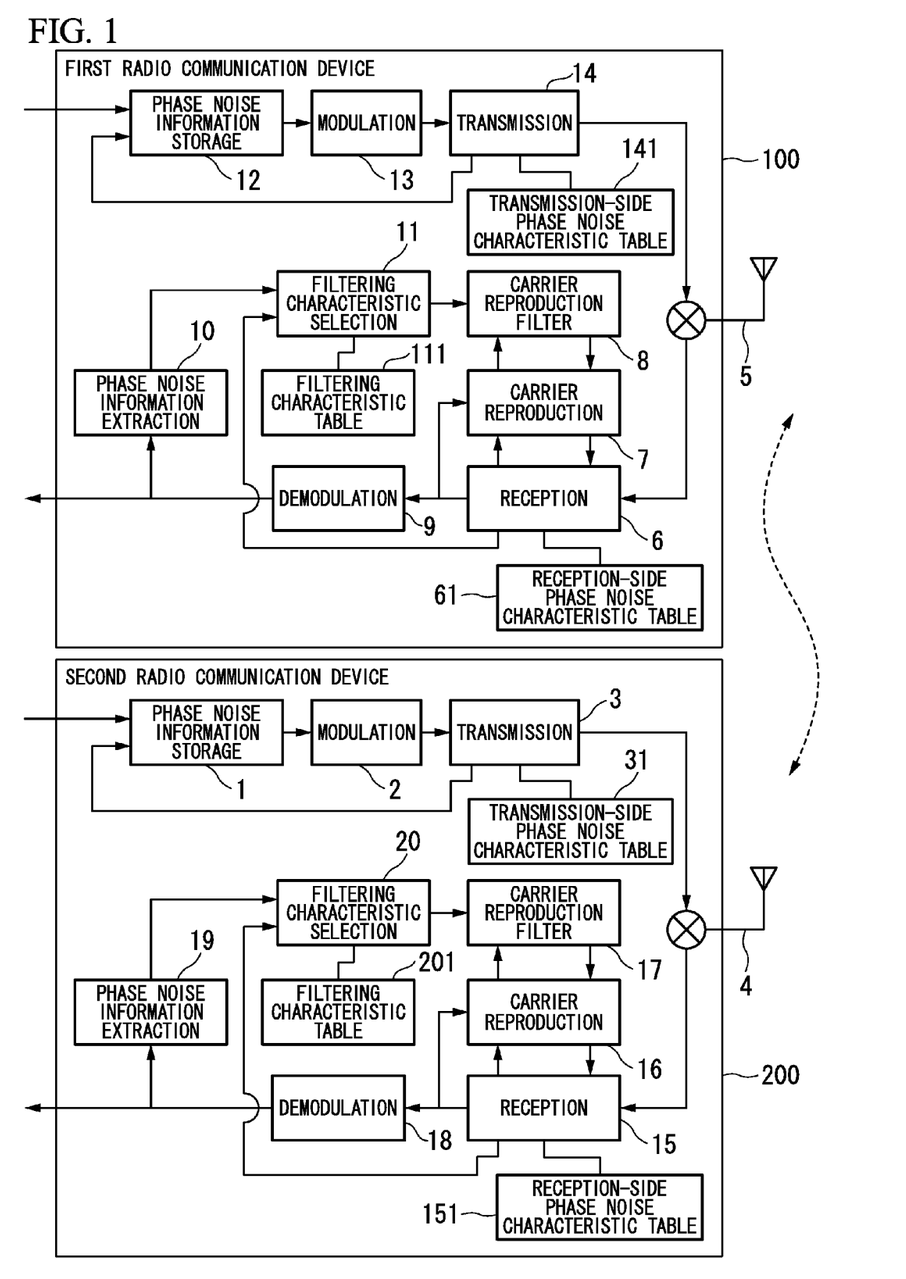
[FIG. 1] A block diagram showing a radio communication device according to a preferred embodiment of the present invention.

FIG. 1 is a block diagram showing a radio communication device according to a preferred embodiment of the present invention. Herein, radio communication is conducted between a first radio communication device 100 and a second radio communication device 200.

In the first radio communication device 100, an antenna 5 sends a reception signal from the second radio communication device 200 to a reception part 6, whilst the antenna 5 transmits an input signal from a transmission part 14 to the second radio communication device 200.

The reception part 6 implements clock synchronization and carrier synchronization on a baseband signal so as to send it to a demodulation part 9 and a carrier reproduction part 7. The reception part 6 reads a reception-side phase noise characteristic, which is stored in a reception-side phase noise characteristic table 61 in advance, so as to send it to a filtering characteristic selection part 11.

The carrier reproduction part 7 detects a carrier phase signal from a baseband signal so as to send it to a carrier reproduction filter 8. The carrier reproduction filter 8 eliminates a noise component from a carrier phase signal so as to send the carrier phase signal back to the carrier reproduction part 7. The carrier reproduction part 7 implements carrier reproduction using the carrier phase signal so as to send a carrier signal to the reception part 6, so that the reception part 6 implements carrier synchronization on the baseband signal.

The carrier reproduction filter 8 changes the filtering characteristic based on a filter setting value of the filtering characteristic selection part 11, thus eliminating a noise component from the carrier phase signal of the carrier reproduction part 7. The carrier reproduction filter 8 sends back the carrier phase signal, from which its noise component has been eliminated, to the carrier reproduction part 7.

The demodulation part 9 demodulates the baseband signal of the reception part 6. The demodulation part 9 sends a demodulated radio frame to an external device and a phase noise information extraction part 10.

The phase noise information extraction part 10 extracts a transmission-side phase noise characteristic of the second radio communication device 200 from the radio frame of the demodulation part 9. The phase noise information extraction part 10 sends the transmission-side phase noise characteristic to the filtering characteristic selection part 11.

The filtering characteristic selection part 11 selects an optimum filtering characteristic, which should be applied to the carrier reproduction filter 8, based on the transmission-side phase noise characteristic of the second radio communication device 200, extracted by the phase noise information extraction part 10, and the reception-side phase noise characteristic of the reception part 6. The filtering characteristic selection part 11 reads a filter setting value, corresponding to the selected filtering characteristic, from a filtering characteristic table 111. The filtering characteristic selection part 11 sends the read filter setting value to the carrier reproduction filter 8.

A phase noise information storage 12 stores an input signal from the external device together with the transmission-side phase noise characteristic of the transmission part 14 in a radio frame so as to send the radio frame to a modulation part 13.

The modulation part 13 modulates the radio frame of the phase noise information storage 12 so as to send a baseband signal to the transmission part 14.

The transmission part 14 converts the baseband signal of the modulation part 13 into a radio frequency signal (an RF signal) so as to send the radio frequency signal to the antenna 5. The transmission part 14 reads a transmission-side phase noise characteristic, which is stored in a transmission-side phase noise characteristic table 141 in advance, so as to send it to the phase noise information storage 12.

The second radio communication device 200 includes a phase noise information storage 1, a modulation part 2, a transmission part 3, an antenna 4, a reception part 15, a carrier reproduction part 16, a carrier reproduction filter 17, a demodulation part 18, a phase noise information extraction part 19, a filtering characteristic selection part 20, a transmission-side phase noise characteristic table 31, a reception-side phase noise characteristic table 151, and a filtering characteristic table 201, thus implementing the same radio communication process as the first radio communication device 100.

Next, the operations of the unique constituent elements of the present embodiment will be described.

The reception part 6 converts an RF signal, received by the antenna 5, into a baseband signal. Additionally, the reception part 6 sends a reception-side phase noise characteristic, stored in the reception-side phase noise characteristic table 61, to the filtering characteristic selection part 11. That is, the phase noise characteristic of the reception part 6, which is measured in advance, is stored in the reception-side phase noise characteristic table 61; thereafter, the reception part 6 reads and sends it to the filtering characteristic selection part 11. As the reception-side phase noise characteristic, for example, it is possible to use a ratio of a signal intensity, at a position distanced by a specific offset frequency, to a reference signal intensity, i.e. a signal intensity at a frequency of a received carrier signal.

The transmission part 14 converts a baseband signal of the modulation part 13 into an RF signal. Additionally, the transmission part reads a transmission-side phase noise characteristic from the transmission-side phase noise characteristic table 141 so as to send it to the phase noise information storage 12. That is, the phase noise characteristic of the transmission part 14, which is measured in advance, is stored in the transmission-side phase noise characteristic table 141; thereafter, the transmission part 14 reads and sends it to the phase noise information storage 12. As the transmission-side phase noise characteristic, for example, it is possible to use a ratio of a signal intensity, at a position distanced by a specific offset frequency, to a reference signal intensity, i.e. a signal intensity at a frequency of a transmitted carrier signal.

The phase noise information extraction part 10 extracts a transmission-side phase noise characteristic of the transmission part 3 of the second radio communication device 200 from a radio frame demodulated by the demodulation part 9. The phase noise information extraction part 10 sends the extracted transmission-side phase noise characteristic to the filtering characteristic selection part 11, so that the carrier reproduction filter 8 selects its filtering characteristic.

The filtering characteristic selection part 11 receives the reception-side phase noise characteristic of the reception part 6 of the first radio communication device 100 and the transmission-side phase noise characteristic of the transmission side 3 of the second radio communication device 200. The filtering characteristic selection part 11 calculates integrated phase noise characteristics based on the reception-side phase noise characteristic and the transmission-side phase noise characteristic. Using integrated phase noise characteristics, the filtering characteristic selection part 11 selects a filtering characteristic of the carrier reproduction filter 8, which is optimum to actual phase noise characteristics of the first radio communication device 100, while setting a filter setting value, corresponding to the selected filtering characteristic, to the carrier reproduction filter 8. To calculate integrated phase noise characteristics, the filtering characteristic selection part 11 adds the transmission-side phase noise characteristic and the reception-side phase noise characteristic together. This calculation method utilizes both the transmission-side phase noise characteristic of the second radio communication device 200 and the reception-side phase noise characteristic of the first radio communication device 100 as materials for selecting a filtering characteristic of the carrier reproduction filter 8 in consideration of an effect of phase noise occurring in transmission of an RF signal from the second radio communication device 200 to the first radio communication device 100. Additionally, this calculation method increases the value of integrated phase noise characteristics in response to an increase of phase noise.

Next, the filtering characteristic selection part 11 selects an optimum filtering characteristic of the carrier reproduction filter 8 based on integrated phase noise characteristics which are calculated. As a method for selecting an optimum filtering characteristic, for example, it is possible to provide two types of filtering characteristics pertaining to a broadband and a narrowband and to set a threshold for switching those filtering characteristics in advance, thus switching over two types of filtering characteristics upon comparison between integrated phase noise characteristics and the threshold. In general, a broadband filtering characteristic is calculated for a radio communication device, undergoing high phase noise, in order to keep track of frequency variations of carrier signals, whilst a narrowband filtering characteristic is calculated for a radio communication device, undergoing low phase noise, in order to reduce filtering noise. In the above method comparing integrated phase noise characteristics with the threshold, a broadband filtering characteristic is selected with respect to high integrated phase noise characteristics (i.e. high phase noise), whilst a narrowband filtering characteristic is selected with respect to low integrated phase noise characteristics (i.e. low phase noise). Thus, it is possible to select filtering characteristics optimum to phase noise characteristics.

The filtering characteristic selection part 11 reads a filter setting value, corresponding to the selected filtering characteristic, from the filtering characteristic table 111 so as to set the filter setting value to the carrier reproduction filter 8. As a filter setting value which is set to the carrier reproduction filter 8, for example, it is possible to employ a tap coefficient of a digital filter.

Next, the phase noise information storage 12 stores the transmission-side phase noise characteristic, from the transmission part 14 of the first radio communication device 100, in a radio frame. The radio frame is transmitted to the second radio communication device 200 by way of the modulation part 13, the transmission part 14, and the antenna 5. The second radio communication device 200 extracts the transmission-side phase noise characteristic from the radio frame for use in selecting a filtering characteristic of the carrier reproduction filter 17.

Figure 2:
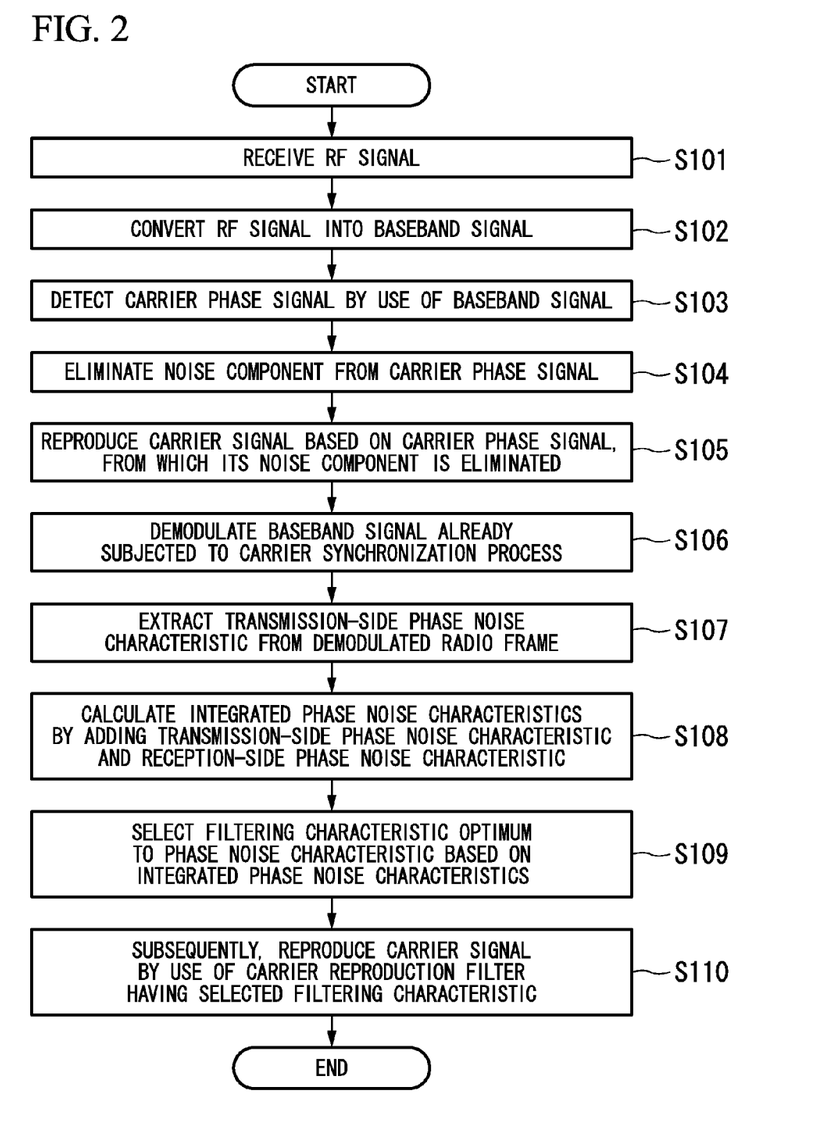
[FIG. 2] A flowchart showing a phase noise elimination and carrier reproduction process in the radio communication device of the present embodiment.

Next, a phase noise elimination and carrier reproduction process, involving the radio communication device of the present embodiment, will be described with reference to a flowchart of FIG. 2.

Herein, the following description refers to the situation in which the first radio communication device 100 receives a signal from the second radio communication device 200.

First, an external device supplies a transmission signal to the phase noise information storage 1 of the second radio communication device 200. At the same time, the transmission part 3 supplies a transmission-side phase noise characteristic, read from the transmission-side phase noise characteristic table 31, to the phase noise information storage 1. The transmission signal and the transmission-side phase noise characteristic are stored in a radio frame, which is sent to the modulation part 2.

Next, the modulation part 2 converts the radio frame into a baseband signal so as to send the baseband signal to the transmission part 3. The transmission part 3 converts the baseband signal into an RF signal so as to transmit the RF signal to the first radio communication device 100 via the antenna 4.

The first radio communication device 100 receives the RF signal, transmitted by the second radio communication device 200, via the antenna 5, so that the RF signal is supplied to the reception part 6 (step S101). The reception part 6 converts the RF signal into a baseband signal (step S102). The reception part 6 sends the baseband signal to the demodulation part 9 and the carrier reproduction part 7.

The carrier reproduction part 7 detects a carrier phase signal from the baseband signal (step S103). It is impossible to stabilize carrier reproduction using the carrier phase signal because the carrier phase signal includes a noise component. For this reason, it is necessary to eliminate a noise component from the carrier phase signal. To eliminate a noise component, the carrier reproduction part 7 sends the carrier phase signal to the carrier reproduction filter 8.

The carrier reproduction filter 8 eliminates a noise component from the carrier phase signal of the carrier reproduction part 7 (step S104). Herein, when the first radio communication device 100 does not receive the transmission-side phase noise characteristic of the second radio communication device 200, a filtering characteristic of the carrier reproduction filter 8 is set to a default value. The default value of a filtering characteristic is not optimized to actual phase noise characteristics of the first radio communication device 100. The carrier reproduction filter 8 sends back the carrier phase signal, from which its noise component is eliminated, to the carrier reproduction part 7. The carrier reproduction part 7 reproduces a carrier signal based on the carrier phase signal, from which its noise component is eliminated with the carrier reproduction filter 8 (step S105). The carrier reproduction part 7 sends the reproduced carrier signal to the reception part 6. The reproduced carrier signal is used for carrier synchronization.

Next, the reception part 6 sends the baseband signal, already subjected to carrier synchronization, to the demodulation part 9, which in turn demodulates the baseband signal (step S106). The demodulation part 9 sends a radio frame, demodulated from the baseband signal, to the external device and the phase noise information extraction part 10.

The phase noise information extraction part 10 extracts the transmission-side phase noise characteristic of the second radio communication device 200 from the radio frame (step S107) so as to send it to the filtering characteristic selection part 11. The reception part 6 reads the reception-side phase noise characteristic of the first radio communication device 100, which is measured in advance, from the reception-side phase noise characteristic table 61 so as to send it to the filtering characteristic selection part 11.

The filtering characteristic selection part 11 calculates integrated phase noise characteristics by adding the transmission-side phase noise characteristic and the reception-side phase noise characteristic together (step S108). This calculation method produces high integrated phase noise characteristics in response to a high transmission-side phase noise characteristic of the transmission part 3 of the second radio communication device 200 and a high reception-side phase noise characteristic of the reception part 6 of the first radio communication device 100. Based on integrated phase noise characteristics which are calculated, the filtering characteristic selection part 11 selects a filtering characteristic optimum to actual phase noise characteristics of the first radio communication device 100 (step S109).

Figure 3:
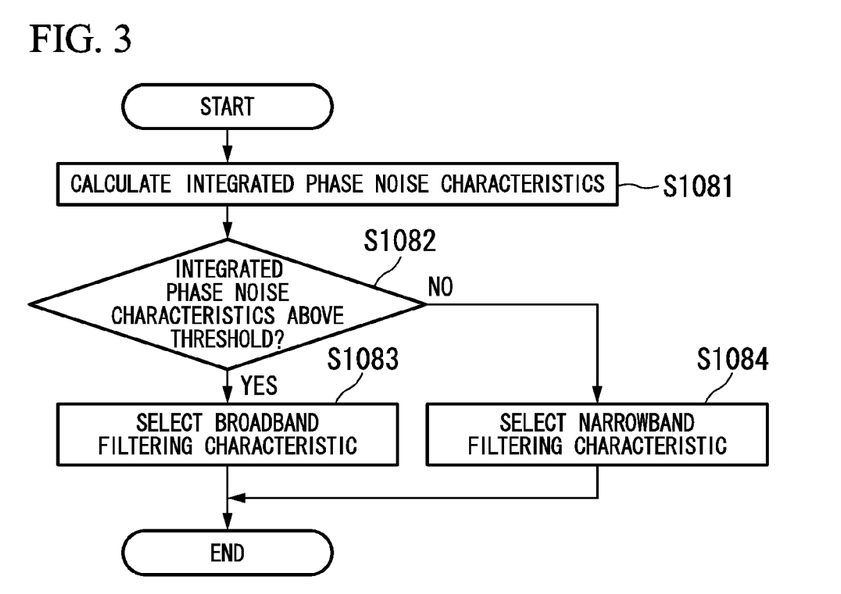
[FIG. 3] A flowchart showing a filtering characteristic selecting process in the radio communication device of the present embodiment.

FIG. 3 is a flowchart showing a filtering characteristic selecting process. Herein, the filtering characteristic selection part 11 adopts a single threshold to select one of two types of filtering characteristics which are set in advance.

First, the filtering characteristic selection part 11 calculates integrated phase noise characteristics (step S1081). The filtering characteristic selection part 11 compares integrated phase noise characteristics with the threshold (step S1082). When integrated phase noise characteristics are higher than the threshold (i.e. when phase noise is high), a broadband filtering characteristic is selected in correspondence with actual phase noise characteristics of the first radio communication device 100 (step S1083). On the other hand, when integrated phase noise characteristics are lower than the threshold (i.e. when phase noise is low), a narrowband filtering characteristic is selected in correspondence with actual phase noise characteristics of the first radio communication device 100 (step S1084).

Next, the filtering characteristic selection part 11 reads a filter setting value, corresponding to the selected filtering characteristic, from the filtering characteristic table 111 so as to set it to the carrier reproduction filter 8. The carrier reproduction filter 8 carries out filtering in accordance with the selected filtering characteristic.

Subsequently, the carrier reproduction part 7 of the first radio communication device 100 reproduces a carrier signal by use of the carrier reproduction filter 8 having the filtering characteristic selected by the filtering characteristic selection part 11 (step S110). Herein, the reception part 6 is able to stabilize carrier synchronization since the filtering characteristic selected by the filtering characteristic selection part 11 is optimized to actual phase noise characteristics of the first radio communication device 100. The second radio communication device 200 implements the same filtering characteristic selecting process as the first radio communication device 100. That is, the filtering characteristic selection part 20 selects a filtering characteristic of the carrier reproduction filter 17 by use of the transmission-side phase noise characteristic of the transmission part 14 of the first radio communication device 100 and the reception-side phase noise characteristic of the reception part 15 of the second radio communication device 200.

In this connection, the present embodiment needs to execute the filtering characteristic selecting process only once with respect to each of radio communication devices conducting radio communication.

The present embodiment is designed such that one of two types of filtering characteristics is selected based on a single threshold; but this is not a restriction. That is, it is possible to classify integrated phase noise characteristics by use of a plurality of thresholds, thus selecting different filtering characteristics for respective classes.

The present invention demonstrates the following effects.
(1) It is possible to stabilize carrier reproduction irrespective of phase noise characteristics since carrier reproduction is carried out using a carrier reproduction filter optimized to actual phase noise characteristics of radio communication devices. For this reason, it is possible to realize a highly reliable radio communication device preventing carrier desynchronization.
(2) It is possible to implement carrier reproduction keeping track of phase noise with ease since carrier reproduction is implemented using a carrier reproduction filter optimized to actual phase noise characteristics of a radio communication device; hence, it is possible to realize a radio communication device preventing BER deterioration due to phase noise.

The radio communication device of the present invention incorporates a computer (or a microprocessor) therein. For this reason, it is possible to store the processing of the present invention in computer-readable storage media in the form of programs in advance, whereby the functionality of the present invention can be implemented by reading programs. In this connection, computer-readable storage media refer to magnetic disks, magneto-optical disks, CD-ROM, DVD-ROM, and semiconductor memory. Alternatively, it is possible to deliver programs to a computer via communication lines, so that the computer executes programs to implement the functionality of the present invention.

It is possible to draft those programs implementing a part of the functionality of the present invention. Alternatively, it is possible to draft those programs in the form of differential files (or differential programs) and execute them in combination with preinstalled programs of a computer, thus implementing the functionality of the present invention.

INDUSTRIAL APPLICABILITY

The present invention is applicable to radio communication devices implementing carrier reproduction and carrier synchronization by use of carrier reproduction filters; hence, the present invention is particularly applicable to bidirectional radio communication systems employing an FDD (Frequency Division Duplex) method or a TDD (Time Division Duplex) method.

DESCRIPTION OF THE REFERENCE NUMERALS 1, 12 phase noise information storage
2, 13 modulation part
3, 14 transmission part
4, 5 antenna
6, 15 reception part
7, 16 carrier reproduction part
8, 17 carrier reproduction filter
9, 18 demodulation part
10, 19 phase noise information extraction part
11, 20 filtering characteristic selection part
31, 141 transmission-side phase noise characteristic table
61, 151 reception-side phase noise characteristic table
111, 201 filtering characteristic table

The invention claimed is:

1. A radio communication device comprising:
a carrier reproduction filter which is configured to eliminate a noise component from a carrier phase signal detected from a received baseband signal;
a carrier reproduction part which is configured to reproduce a carrier signal based on the carrier phase signal;
a reception part which is configured to implement carrier synchronization using the carrier signal;
a phase noise information extraction part which is configured to extract a transmission-side phase noise characteristic from a radio frame demodulated from the carrier signal; and
a filtering characteristic selection part which is configured to calculate integrated phase noise characteristics by adding a predetermined reception-side phase noise characteristic to the extracted transmission-side phase noise characteristic and which is configured to select a filtering characteristic based on comparison between a predetermined threshold and the integrated phase noise characteristics,
wherein the filtering characteristic selection part selects a broadband filtering characteristic with respect to the integrated phase noise characteristics higher than the threshold while selecting a narrowband filtering characteristic with respect to the integrated phase noise characteristics lower than the threshold.

2. The radio communication device according to claim 1, wherein a predetermined default value is applied to the carrier reproduction filter as its filtering characteristic with respect to a firstly received baseband signal, while the filtering characteristic selected by the filtering characteristic selection part is applied to the carrier reproduction filter with respect to a subsequent baseband signal.

3. The radio communication device according to claim 1 further comprising:
a phase noise information storage which is configured to store a predetermined transmission-side phase noise characteristic in the radio frame;
a modulation part which is configured to modulate the radio frame storing the predetermined transmission-side phase noise characteristic into a baseband signal; and
a transmission part which is configured to convert the baseband signal into an RF signal.

4. The radio communication device according to claim 1, wherein the reception-side phase noise characteristic is defined as a ratio of a signal intensity at a frequency which is distanced from a frequency of the received carrier signal by a specific offset frequency to a signal intensity at the frequency of the received carrier signal.

5. The radio communication device according to claim 1, wherein the transmission-side phase noise characteristic is defined as a ratio of a signal intensity at a frequency which is distanced from a frequency of the transmitted carrier signal by a specific offset frequency to a signal intensity at the frequency of the transmitted carrier signal.

6. A carrier reproduction method comprising:
eliminating a noise component from a carrier phase signal detected from a received baseband signal;
reproducing a carrier signal based on the carrier phase signal;
implementing carrier synchronization using the carrier signal;
extracting a transmission-side phase noise characteristic from a radio frame demodulated from the carrier signal;
calculating integrated phase noise characteristics by adding a predetermined reception-side phase noise characteristic to the extracted transmission-side phase noise characteristic; and
selecting a filtering characteristic based on a comparison between a predetermined threshold and the integrated phase noise characteristics,
wherein a broadband filtering characteristic is selected with respect to the integrated phase noise characteristics higher than the threshold while a narrowband filtering characteristic is selected with respect to the integrated phase noise characteristics lower than the threshold.

7. The carrier reproduction method according to claim 6, wherein a filtering characteristic having a predetermined default value is adopted to eliminate phase noise from the carrier phase signal with respect to a firstly received baseband signal, whilst the selected filtering characteristic is adopted to eliminate phase noise from the carrier phase signal with respect to a subsequent baseband signal.

8. A radio communication method comprising:
- implementing the carrier reproduction method according to claim 6 on a received radio signal;
- implementing carrier synchronization on a reproduced carrier signal; and
- demodulating the radio signal already subjected to carrier synchronization.

9. The radio communication method according to claim 8 further comprising:
- storing a transmission signal and a transmission-side phase noise characteristic in a radio frame;
- modulating the radio frame into a baseband signal;
- converting the baseband signal into a radio signal; and
- transmitting the radio signal.

10. A non-transient computer-readable storage medium containing computer code which when executed on a computer causes the computer to implement a radio communication method comprising:
- eliminating a noise component from a carrier phase signal detected from a received baseband signal;
- reproducing a carrier signal based on the carrier phase signal;
- implementing carrier synchronization using the carrier signal;
- extracting a transmission-side phase noise characteristic from a radio frame demodulated from the carrier signal;
- calculating integrated phase noise characteristics by adding a predetermined reception-side phase noise characteristic to the extracted transmission-side phase noise characteristic; and
- selecting a filtering characteristic based on a comparison between a predetermined threshold and the integrated phase noise characteristics,
- wherein a broadband filtering characteristic is selected with respect to the integrated phase noise characteristics higher than the threshold while a narrowband filtering characteristic is selected with respect to the integrated phase noise characteristics lower than the threshold.

11. The non-transient computer-readable storage medium according to claim 10, wherein a filtering characteristic having a predetermined default value is adopted to eliminate phase noise from the carrier phase signal with respect to a firstly received baseband signal, whilst the selected filtering characteristic is adopted to eliminate phase noise from the carrier phase signal with respect to a subsequent baseband signal.

* * * * *